(12) United States Patent
Liu

(10) Patent No.: US 8,657,544 B2
(45) Date of Patent: Feb. 25, 2014

(54) FIXING DEVICE

(75) Inventor: Dian-Cai Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 166 days.

(21) Appl. No.: 13/226,507

(22) Filed: Sep. 7, 2011

(65) Prior Publication Data

US 2012/0170991 A1     Jul. 5, 2012

(30) Foreign Application Priority Data

Dec. 30, 2010   (CN) .......................... 2010 1 0614863

(51) Int. Cl.
  *F16B 39/36* (2006.01)
(52) U.S. Cl.
  CPC ..................................... *F16B 39/36* (2013.01)
  USPC .......................................... 411/266; 411/278
(58) Field of Classification Search
  USPC ........................... 411/265–268, 270, 277–279
  See application file for complete search history.

(56) References Cited

U.S. PATENT DOCUMENTS

| | | | | |
|---|---|---|---|---|
| 897,168 | A * | 8/1908 | Smith | 411/222 |
| 1,328,401 | A * | 1/1920 | Savidge | 411/222 |
| 1,353,382 | A * | 9/1920 | Crissinger | 411/226 |
| 2,472,742 | A * | 6/1949 | Brown | 301/128 |
| 3,381,732 | A * | 5/1968 | Engelmann | 411/265 |
| 4,086,946 | A * | 5/1978 | Keen | 411/279 |
| 5,161,928 | A * | 11/1992 | Burdick, Jr. | 411/433 |
| 6,050,764 | A * | 4/2000 | Oberle et al. | 411/354 |
| 6,179,539 | B1 * | 1/2001 | Benoit et al. | 411/433 |

FOREIGN PATENT DOCUMENTS

| | | |
|---|---|---|
| CN | 1083902 A | 3/1994 |
| CN | 101849116 A | 9/2010 |

* cited by examiner

*Primary Examiner* — Flemming Saether
(74) *Attorney, Agent, or Firm* — Altis Law Group, Inc.

(57) ABSTRACT

A fixing device used for fixing a pivot shaft includes a latching member and a fastening member. The latching member has a hollow conical latching portion. The fastening member defines a conical hole corresponding to the conical latching portion of the latching member. The latching member is capable of deforming elastically along a radial direction, and the fastening member is tightly sleeved on the latching portion of the latching member.

3 Claims, 4 Drawing Sheets

FIXING DEVICE

BACKGROUND

1. Technical Field

The present disclosure relates to fixing devices and, particularly, to a fixing device used for fixing a rotary shaft.

2. Description of Related Art

An existing method for fixing a rotary shaft along an axial direction includes using a screw nut to fix one end portion of the rotary shaft. However, in use, the rotary shaft is often driven to rotate at various high speeds, thereby generating vibrations that can loosen the screw nut.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
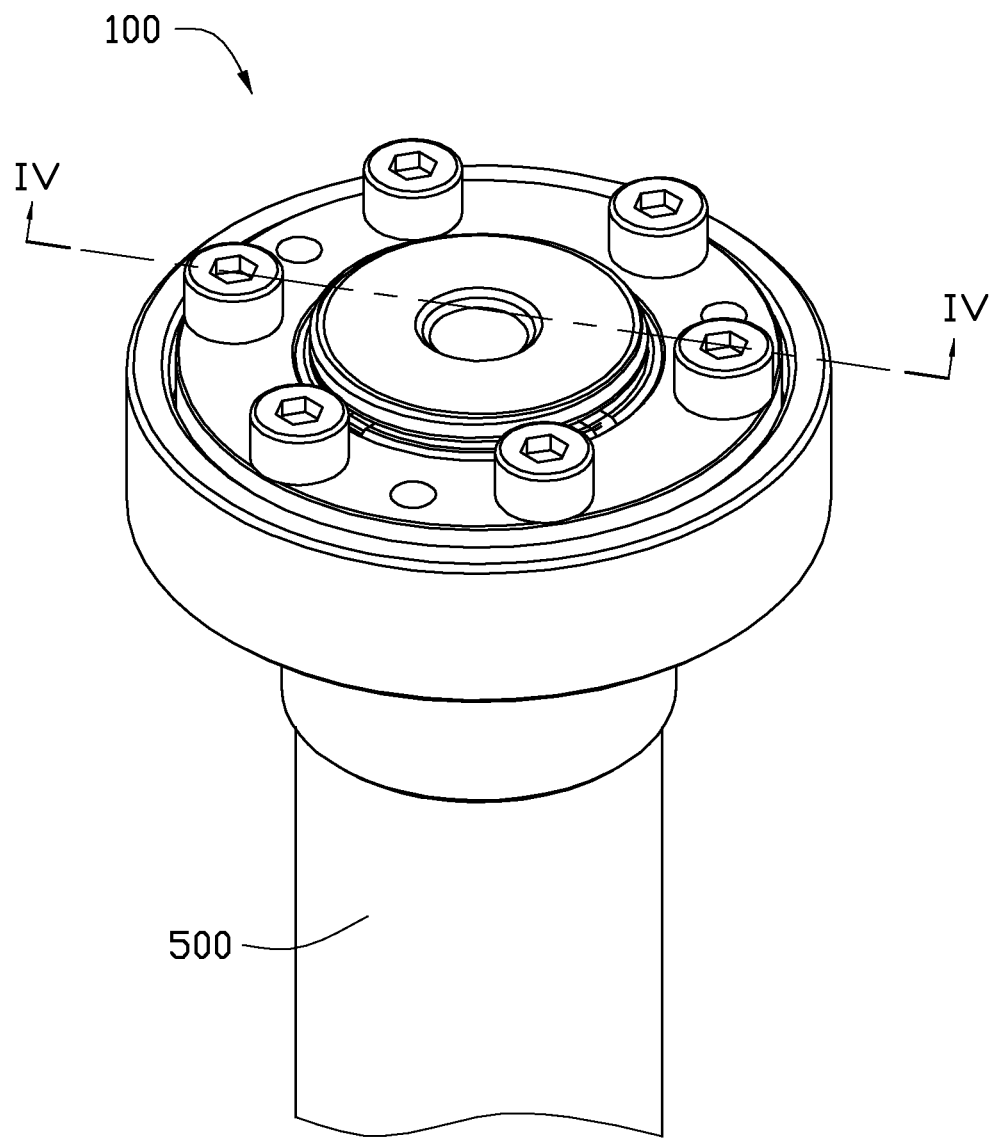
FIG. 1 is an isometric view of an embodiment of a fixing device assembled to a rotary shaft.
Figure 2:
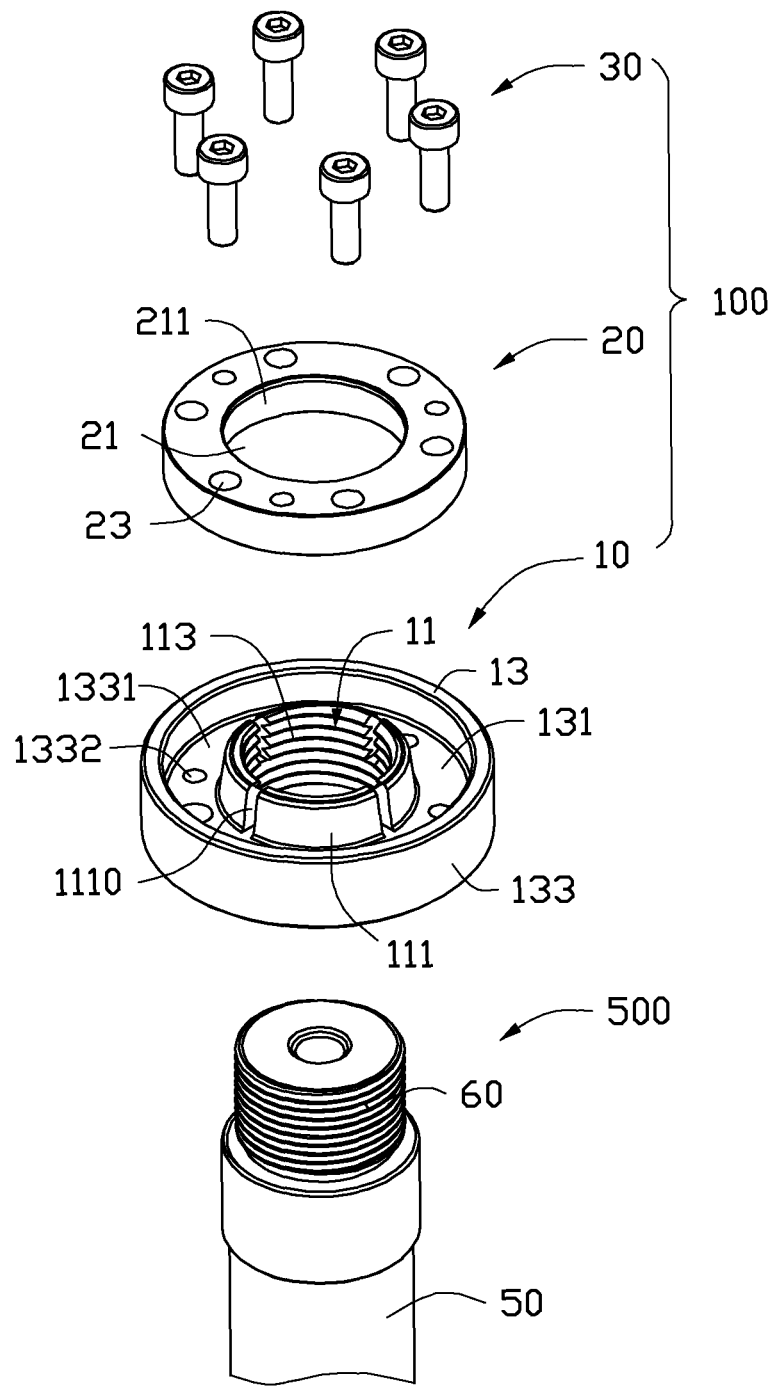
FIG. 2 is an isometric, exploded view of the fixing device and the rotary shaft of FIG. 1.

Referring to FIGS. 1 and 2, an embodiment of a fixing device 100 for fixing a pivot shaft 500 is shown. The fixing device 100 includes a latching member 10, a fastening member 20, and a plurality of connecting members 30. In the illustrated embodiment, the pivot shaft 500 includes a main shaft portion 50 and a threaded portion 60 formed at one end of the main shaft portion 50. The latching member 10 is sleeved on and engaged with the threaded portion 60. The fastening member 20 is mounted to the latching member 10 via the plurality of connecting members 30.

Figure 3:
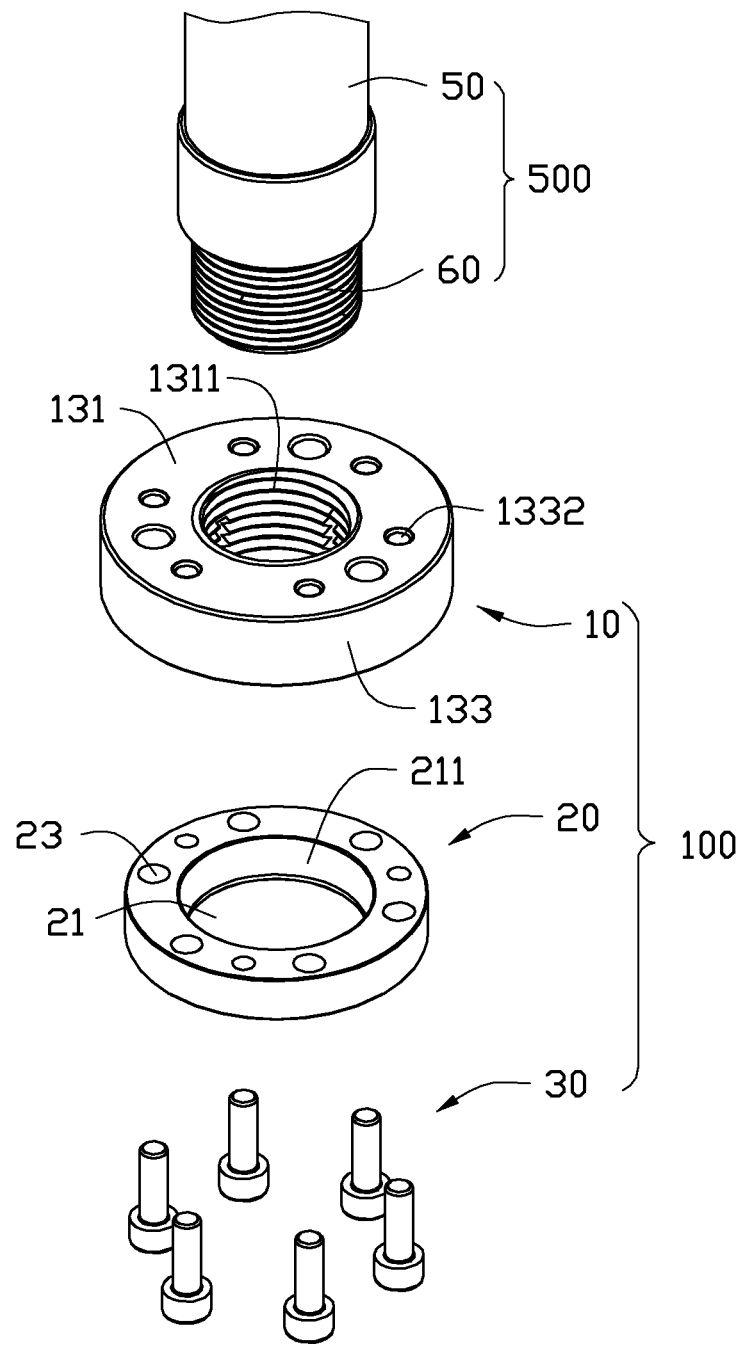
FIG. 3 is similar to FIG. 2, but viewed from another aspect.

Also referring to FIG. 3, the latching member 10 includes a latching portion 11 and a mounting portion 13 coaxially formed with and surrounding the latching portion 11. The latching portion 11 is substantially ring-shaped and is capable of deforming elastically along a radial direction thereof. In the illustrated embodiment, the latching portion 11 has a hollow conical frustum structure. The latching portion 11 includes a conical outside wall 111 and a threaded inside wall 113. A plurality of deformation slots 1110 are axially defined through the outer periphery of the latching portion 11, thereby enhancing the elastic deformation performance of the latching portion 11. In the illustrated embodiment, there are four deformation slots 1110 symmetrically and axially defined through the periphery of the latching portion 11. It is to be understood that, the number of the deformation slots 1110 may be more than four or less than four. The threaded inside wall 113 fits and tightly engages with the threaded portion 60 of the pivot shaft 500.

The mounting portion 13 includes a bottom wall 131 radially extending from one end of the outer peripheral of the outside wall 111 of the latching portion 11, and a peripheral wall 133, which is substantially cylindrical and extending from an outer peripheral edge of the bottom wall 131. The bottom wall 131 defines a through hole 1311 coaxially communicating with the latching portion 11. In the illustrated embodiment, the inner diameter of the latching portion 11 decreases along a direction away from the bottom wall 131 surface. The peripheral wall 133 is coaxially positioned around the outside wall 111. The peripheral wall 133, the bottom wall 131, and the outside wall 111 of the latching portion 11 cooperatively define an assembling chamber 1331. A plurality of connecting holes 1332 are defined through the bottom wall 131 of the mounting portion 13.

The fastening member 20 is sized such that, the fastening member 20 can be mounted to and received within the assembling chamber 1331 using the connecting members 30. A conical hole 21 is defined through a substantially middle portion of the fastening member 20, corresponding to the latching portion 11. The conical hole 21 has a conical inner wall 211, and the conical inner wall 211 has a substantially same dimensions as that of the outside wall 111 of the latching portion 11. A plurality of fixing holes 23 is separately defined through the fastening member 20 corresponding to the connecting holes 1332 of the latching member 10, and positioned adjacent to a peripheral edge of the fastening member 20 to surround the conical hole 21.

Figure 4:
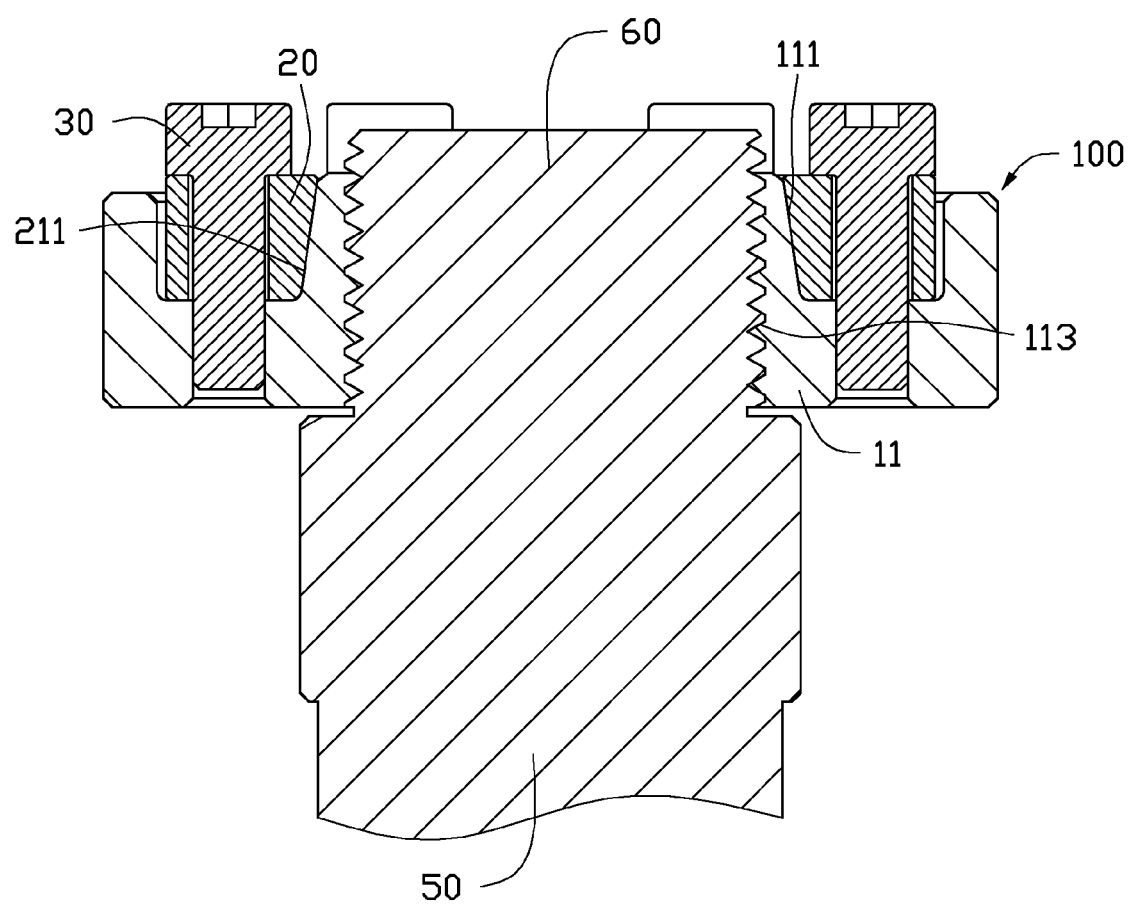
FIG. 4 is a cross sectional view taken along line IV-IV of FIG. 1.

Also referring to FIG. 4, the connecting members 30 are configured for connecting the latching member 10 and the fastening member 20 together. In the illustrated embodiment, the connecting members 30 are a plurality of bolts.

When assembling the fixing device 100 to the pivot shaft 500, the through hole 1311 is aligned with the threaded portion 60, and the threaded inside wall 113 engages with the threaded portion 60. The conical hole 21 is aligned with the latching portion 11, and the fastening member 20 is then sleeved on the latching portion 11 and received within the assembling chamber 1331. The conical inner wall 211 tightly resists against the conical outside wall 111. The connecting members 30 extend through the fixing holes 23 and engage the connecting holes 1332, thereby fixing the fastening member 20 to the latching member 10.

Since the fastening member 20 is fixed to the latching member 10, and the conical inner wall 211 tightly resists against the conical outside wall 111, in use, when the pivot shaft 500 rotates and causing the threaded portion 60 end of the pivot shaft 500 to vibrate, the conical inner wall 211 is urged to deform and generate an elastic resisting force against the corresponding conical outside wall 111, thereby efficiently preventing the latching member 10 from loosening. Thus, the latching portion 11 of the latching member 10 is reliably assembled to the threaded portion 60 of the pivot shaft 500.

Although numerous characteristics and advantages of the disclosure have been set forth in the foregoing description, together with details of the structure and function of the embodiment, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A fixing device, comprising:
   a latching member having a latching portion and a mounting portion coaxially formed with and surrounding the latching portion, the latching portion is hollow and conical, the latching portion comprises a conical outside wall and a threaded inside wall, the mounting portion comprises a bottom wall radially extending from one end of the outer peripheral of the outside wall of the latching portion;

a fastening member defining a conical hole corresponding to the conical latching portion of the latching member; and a plurality of connecting members, wherein the latching member is capable of deforming elastically along a radial direction thereof, and the fastening member is tightly sleeved on the latching portion of the latching member, the bottom wall of the mounting portion defines a plurality of connecting holes therein, the fastening member defines a plurality of fixing holes corresponding to the plurality of connecting holes of the latching member, and the plurality of connecting members pass through the plurality of fixing holes of the fastening member and are fixed to the plurality of connecting holes of the latching member;

wherein the conical hole of the fastening member has a conical inner wall having a substantially same dimensions as that of the outside wall of the latching portion of the latching member, the conical inner wall of the fastening member tightly resists against the conical outside wall of the latching portion;

wherein the mounting portion further comprises a through hole defined through the bottom wall to coaxially communicate with the latching portion; an inner diameter of the latching portion decreases along an axial direction away from the bottom wall;

wherein the mounting portion further comprises a peripheral wall extending from an outer peripheral edge of the bottom wall, and coaxially positioned around the outside wall of the latching portion, the peripheral wall, the bottom wall and the outside wall of the latching portion cooperatively define an assembling chamber, and the fastening member is mounted to and received within the assembling chamber of the latching member.

2. The fixing device of claim 1, wherein the latching portion defines a plurality of deformation slots through the outer periphery of the latching portion axially.

3. A fixing device for fixing a pivot shaft, comprising:

a latching member sleeved on one end of the pivot shaft, the latching member comprising a hollow conical latching portion defining a plurality of deformation slots through an outer periphery of the latching portion axially and a mounting portion coaxially formed with and surrounding the latching portion, the latching portion comprises a conical outside wall and a threaded inside wall, the mounting portion comprises a bottom wall radially extending from one end of the outer peripheral of the outside wall of the latching portion;

a fastening member defining a conical hole corresponding to the conical latching portion of the latching member; and a plurality of connecting members, wherein the fastening member is tightly sleeved on and resisting against the latching portion of the latching member, the bottom wall of the mounting portion defines a plurality of connecting holes therein, the fastening member defines a plurality of fixing holes corresponding to the plurality of connecting holes of the latching member, and the plurality of connecting members pass through the plurality of fixing holes of the fastening member and are fixed to the plurality of connecting holes of the latching member;

wherein the conical hole of the fastening member has a conical inner wall having a substantially same dimension as that of the outside wall of the latching portion of the latching member; the conical inner wall of the fastening member tightly resists against the conical outside wall of the latching portion; the pivot shaft comprises a main shaft portion and a threaded portion formed at one end of the main shaft portion, the threaded inside wall of the latching portion of the latching member engages with the threaded portion of the pivot shaft, wherein the mounting portion further comprises a though hole defined through the bottom wall to coaxially communicate with the latching portion; an inner diameter of the latching portion decreases along an axially direction away from the bottom wall;

wherein the mounting portion further comprises a peripheral wall extending from an outer peripheral edge of the bottom wall, and coaxially positioned around the outside wall of the latching portion; the peripheral wall, the bottom wall and the outside wall of the latching portion cooperatively define an assembling chamber, and the fastening member is mounted to and received within the assembling chamber of the latching member.

\* \* \* \* \*